United States Patent
Bent et al.

(10) Patent No.: US 9,692,744 B2
(45) Date of Patent: *Jun. 27, 2017

(54) SECURE USER AUTHENTICATION IN A DYNAMIC NETWORK

(71) Applicant: International Business Machines Corporation, Armonk, NY (US)

(72) Inventors: Graham A. Bent, Southampton (GB); Dominic P. Harries, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,995

(22) Filed: Jun. 16, 2016

(65) Prior Publication Data

US 2017/0093842 A1 Mar. 30, 2017

Related U.S. Application Data

(63) Continuation of application No. 14/193,127, filed on Feb. 28, 2014, now Pat. No. 9,419,960.

(30) Foreign Application Priority Data

Mar. 18, 2013 (GB) .................................. 1304916.8

(51) Int. Cl.
 *H04L 29/06* (2006.01)
 *H04L 9/08* (2006.01)
(52) U.S. Cl.
 CPC ........ *H04L 63/0807* (2013.01); *H04L 9/0822* (2013.01)

(58) Field of Classification Search
 CPC .......................... H04L 63/0807; H04L 9/0822
 See application file for complete search history.

(56) References Cited

U.S. PATENT DOCUMENTS 5,784,463 A 7/1998 Chen et al.
6,970,869 B1 11/2005 Slaughter et al.
(Continued)

OTHER PUBLICATIONS

Neuman, B. Clifford, et al. "Kerberos: An authentication service for computer networks.", Retrieved from http://ieeexplore.ieee.org/stamp/stamp.jsp?arnumber=312841 , IEEE Communications magazine 32.9 (1994): 33-38.*

(Continued)

*Primary Examiner* — Chau Le
*Assistant Examiner* — Muhammad Chaudhry
(74) *Attorney, Agent, or Firm* — Law Office of Jim Boice (57) ABSTRACT

A method, apparatus and/or computer program provides secure user authentication in a network having a dynamic set of services. The method comprises a client authenticating with an edge service and generating a query key. The edge service issues a request to the dynamic set of services. The request comprises (i) an encrypted identifier associated with the client, (ii) a private portion of the request being encrypted with the query key, and (iii) a public portion of the request. In response to ascertaining from the public portion of the request that it is able to respond to the request, one or more of the dynamic set of services respond to the edge service with (i) an identifier associated with the dynamic set of services, and (ii) the identifier associated with the client. The edge service then authenticates that it is able to respond to the request, including generating a session key.

12 Claims, 6 Drawing Sheets

(56) References Cited

U.S. PATENT DOCUMENTS

| 8,302,171 | B2 | 10/2012 | Le Saint |
| 2002/0191795 | A1 | 12/2002 | Wills |
| 2003/0018913 | A1 | 1/2003 | Brezak et al. |
| 2003/0115341 | A1 | 6/2003 | Sinha et al. |
| 2004/0128499 | A1* | 7/2004 | Peterka ............... H04L 63/062 713/155 |
| 2005/0108575 | A1 | 5/2005 | Yung |
| 2007/0192836 | A1 | 8/2007 | Shiran et al. |
| 2007/0220598 | A1 | 9/2007 | Salowey et al. |
| 2008/0115199 | A1 | 5/2008 | Young et al. |
| 2009/0029677 | A1 | 1/2009 | Choi et al. |
| 2009/0110200 | A1* | 4/2009 | Srinivas ............... G06F 21/335 380/279 |
| 2009/0259849 | A1 | 10/2009 | Faynberg et al. |
| 2012/0131661 | A1 | 5/2012 | Novak et al. |
| 2013/0024688 | A1 | 1/2013 | Wen et al. |
| 2013/0237148 | A1 | 9/2013 | McCann et al. |

OTHER PUBLICATIONS

Steiner, Jennifer G., et al. "Kerberos: An Authentication Service for Open Network Systems.", Retrieved from http://vglab.cse.iitd.ernet.in/~sbansal/os/previous_years/2011/bib/steiner88kerberos.pdf , USENIX Winter. 1988.*

A. Pirzada, et al., "Kerberos Assisted Authentication in Mobile Ad-Hoc Networks", Australian Computer Society, Inc., Conferences in Research and Practice in Formation Technology, vol. 26, 2004, pp. 1-6.

Han, et al., "An Adoption of Kerberos to 3G Network for Mutual Authentication: Challenges and Evaluations", Performance Evaluation of Computer and Telecommunication Systems, 2008, SPECTS 2008, (Abstract Only).

UK Intellectual Property Office, Search Report for Application No. GB1304916.8, Mailed on Oct. 7, 2013, pp. 1-3.

Harbola, et al., "A New A3 Kerberos Model", International Journal of Advanced Research in Computer Science and Software Engineering, vol. 2, Issue 3, Mar. 2012, pp. 290-293.

Arora, et al. "Implementation of Authentication and Transaction Security Based on Kerberos", International Journal of Innovative Technology & Creative Engineering, vol. 1, No. 2, Feb. 2011, pp. 10-19.

K. Hornstein, "Subject 1.27: What Are Renewable Tickets?", Naval Research Laboratory, 2000, p. 1 of 1.

Kohl, et al., "The Kerberos Network Authentication Service (V5)", Network Working Group, Request for Comments: 1510, Sep. 1993, pp. 1-105.

Bent, et al., "A Dynamic Distributed Federated Database", Proceedings of 2nd Annual Confereence International Technology Alliance, 2008, pp. 1-8.

Boneh, et al., "Efficient Selective-ID Secure Identity Based Encryption Without Random Oracles", Advances in Cryptology—EUROCRYPT 2004, vol. 3027 of Lecture Notes in Computer Science, pp. 1-20.

Al-Riyami, et al., "Certificateless Public Key Cryptography", Advances in Cryptology—ASIACRYPT 2003, pp. 1-40.

Bent, et al., "Extending the Kerberos Protocol for Distributed Data as a Service", Annual Conference of the International Technology Alliance, May 15, 2012, pp. 1-7 (Grace Period Disclosure).

U.S. Appl. No. 14/193,127 Non-Final Office Action Mailed Dec. 23, 2015.

* cited by examiner

PRIOR ART

SECURE USER AUTHENTICATION IN A DYNAMIC NETWORK

STATEMENT REGARDING FEDERALLY SPONSORED RESEARCH OR DEVELOPMENT

This invention was made with Government support under Contract Number W911NF-06-3-0001 awarded by the United States Army. The Government has certain rights to this invention.

STATEMENT REGARDING PRIOR DISCLOSURES BY THE INVENTOR OR A JOINT INVENTOR

A "grace period disclosure" was published on May 15, 2012, less than one year before the foreign priority date of Mar. 18, 2013. This publication was entitled "Extending the Kerberos Protocol for Distributed Data as a Service". The joint authors of this publication were Graham Bent, Dominic Harries, and Andrew J. Toth. Graham Bent and Dominic Harries are co-inventors of the invention described and claimed in the present patent application, and are named as such in the present patent application U.S. filing documents. However, Andrew J. Toth, although a co-author of the publication "Extending the Kerberos Protocol for Distributed Data as a Service", did not contribute material to this publication that was related to the subject matter of the present patent application. Thus, any material in the publication "Extending the Kerberos Protocol for Distributed Data as a Service" that is related to the present patent application was written by the present co-inventors, Graham Bent and Dominic Harries, and no other person.

BACKGROUND

The present invention relates to a method of secure user authentication in a dynamic network and more particularly to a method of secure user authentication in which a service does not need to obtain authentication tickets for all dynamic services that could respond to a request in advance of enquiring of the dynamic services whether they can handle the request.

Kerberos is an authentication protocol for distributed networks of computers. Based on the Needham-Schroder Symmetric Key Protocol, it has gained widespread popularity and is supported on a wide range of platforms including Windows, Linux, Solaris, AIX, and z/OS (Kerberos is a trademark of Massachusetts Institute of Technology (MIT), Windows is a trademark of Microsoft Corp., Linux is a trademark of Linus Torvalds, Solaris is a trademark of Oracle America Inc. and AIX and z/OS are trademarks of International Business Machines Corporation).

The Kerberos protocol provides a secure connection between a client and a server providing a service using a central server, known as the Authentication Server (AS), which authenticates a client and also authenticates specified services that have registered with the Authentication Server (AS). The protocol is based on the use of tickets, which are short-lived credentials passed to services that a client would like to access. These tickets are obtained from a Ticket Granting Service (TGS). The specified services and the client each only work together when they confirm that the other is authenticated with the Authentication Server.

From its inception it was noted that the traditional Kerberos protocol presents a number of challenges in terms of its scalability and the potential vulnerability of a centralised certificate authority, the Authorisation Server (AS). This gave rise to significant research into alternative approaches that are better suited to a peer to peer authentication with various public key cryptographic (PKC) services being devised.

D. Boneh and X. Boyen, "Efficient selective-id secure identity-based encryption without random oracles", Advances in Cryptology—EUROCRYPT 2004. Springer, 2004, pp. 223-38 discloses an identity based PKC (ID-PKC). Identity-based encryption (IBE) provides a public key encryption mechanism where a public key is an arbitrary string such as an e-mail address or a telephone number. The corresponding private key can only be generated by a Private Key Generator (PKG) which has knowledge of a master secret. In an IBE system, users authenticate themselves to the PKG and obtain private keys corresponding to their identities.

S. Al-Riyami and K. Paterson, "Certificateless public key cryptography", Advances in Cryptology-ASIACRYPT 2003, pp. 452-73, 2003 discloses a certificateless public key cryptography (CL-PKC) scheme. In contrast to traditional public key cryptographic systems, CL-PKC does not require the use of certificates to guarantee the authenticity of public keys. It does rely on the use of a trusted third party (TTP) who is in possession of a master key. In these respects, CL-PKC is similar to identity-based public key cryptography (ID-PKC). On the other hand, CL-PKC does not suffer from the key escrow property that seems to be inherent in ID-PKC. Thus CL-PKC can be seen as a model for the use of public key cryptography that is intermediate between traditional certificated PKC and ID-PKC.

Nevertheless Kerberos has stood the test of time and given its wide range of platform support, particularly Windows, it is not surprising to find that it is widely adopted.

Kerberos is designed to work in systems where a service that can fulfil a client's request is known in advance, and the set of services involved in one request is small and constant. When employed in a dynamic network where multiple unknown services could respond to one request, the design does not work so well. A ticket must be requested for every service that could be involved in a request, and authentication must be carried out with each service prior to (or during) the request.

G. Bent, P. Dantressangle, D. Vyvyan, A. Mowshowitz, and V. Mitsou, "A dynamic distributed federated database" in Proc. 2nd Ann. Conf. International Technology Alliance, 2008 discloses the "GaianDB" Database, in which this set of services could be very large. A new type of database architecture is defined as a dynamic distributed federated database (DDFD). Biologically inspired principles of network growth combined with graph theoretic methods are used to develop and maintain the DDFD. The DDFD uses a 'Store Locally Query Anywhere' mechanism (SLQA), which provides for global access to data from any vertex in the database network.

SUMMARY

In one embodiment of the present invention, a method provides secure user authentication in a network having a dynamic set of services. A hardware client computer authenticates with an edge service by authenticating with an Authentication Server (AS) that provides a first ticket allowing the hardware client computer to authenticate with a Ticket Granting Service (TGS), where the TGS provides a second ticket allowing the hardware client computer to authenticate with the edge service. The hardware client computer generates a query key using a one way function of a portion of the first ticket provided by the AS to allow the hardware client computer to authenticate with the TGS. An authentication hardware server authenticates an edge service that issues a request to the dynamic set of services, where the request includes: an identifier associated with the hardware client computer, the identifier being encrypted with the query key, a private portion of the request being encrypted with the query key, where the private portion of the request is shared only with services that have been authenticated by the authentication hardware server, and a public portion of the request, where the public portion of the request is shared with all services that can respond to the request regardless of authentication by the authentication hardware server. A hardware network has a dynamic set of services, where one or more of the dynamic set of services, in response to ascertaining from the public portion of the request that it is able to respond to the request, respond to the edge service with (i) an identifier associated with the one or more of the dynamic set of services, and (ii) the identifier associated with the hardware client computer, where the identifier associated with the hardware client computer is encrypted with the query key; where the edge service authenticates with the one or more of the dynamic set of services that the edge service is able to respond to the request by authenticating with the AS, where the AS provides a third ticket allowing the edge service to authenticate with the TGS, where the TGS provides a fourth ticket allowing a single service to authenticate with one or more of the dynamic set of services, where the edge service generates a session key using a one way function of a portion of the third ticket provided by the AS to allow the edge service to authenticate with the TGS; and where the edge service sends the query key, to the one or more of the dynamic set of services, encrypted using the session key. One or more processors access a specific service from the one or more of the dynamic set of services by traversing through multiple intermediary services in order to reach the specific service, where at least one service from the multiple intermediary services provides access to the query key.

In one embodiment of the present invention, a computer program product provides secure user authentication in a network having a dynamic set of services. The computer program product includes a non-transitory computer readable storage medium having program code embodied therewith. The program code is readable and executable by a processor to perform a method of: a client authenticating with an edge service by authenticating with an Authentication Server (AS) that provides a first ticket allowing the client to authenticate with a Ticket Granting Service (TGS), where the first ticket has a lifetime that is defined by a predefined start time and a predefined end time, where the TGS provides a second ticket allowing the client to authenticate with the edge service; the client generating a query key using a one way function of a portion of the first ticket provided by the AS to allow the client to authenticate with the TGS; the edge service issuing a request to the dynamic set of services, the request including: an identifier associated with the client, the identifier being encrypted with the query key, a private portion of the request being encrypted with the query key, where the private portion of the request is shared only with services that have been authenticated by the authentication hardware server, and a public portion of the request, where the public portion of the request is shared with all services that can respond to the request regardless of authentication by the authentication hardware server; one or more of the dynamic set of services, in response to ascertaining from the public portion of the request that it is able to respond to the request, responding to the edge service with (i) an identifier associated with the one or more of the dynamic set of services, where the one or more of the dynamic set of services caches the query key from a request for use with a future request from the client, and (ii) the identifier associated with the client, where the identifier associated with the client is encrypted with the query key; the edge service authenticating with the one or more of the dynamic set of services, that the edge service is able to respond to the request by authenticating with the AS, where the AS provides a third ticket allowing the edge service to authenticate with the TGS, where the TGS provides a fourth ticket allowing a single service to authenticate with one or more of the dynamic set of services, where the edge service generates a session key using a one way function of a portion of the third ticket provided by the AS to allow the edge service to authenticate with the TGS; and the edge service sending the query key, to the one or more of the dynamic set of services, encrypted using the session key.

In one embodiment of the present invention, a computer system includes one or more processors, one or more computer readable memories, and one or more computer readable storage mediums, and program instructions stored on at least one of the one or more storage mediums for execution by at least one of the one or more processors via at least one of the one or more memories. The stored program instructions include: program instructions to authenticate a client with an edge service by authenticating with an Authentication Server (AS) that provides a first ticket allowing the client to authenticate with a Ticket Granting Service (TGS), where the TGS provides a second ticket allowing the client to authenticate with the edge service; program instructions to generate a query key using a one way function of a portion of the first ticket provided by the AS to allow the client to authenticate with the TGS; program instructions to issue a request to a dynamic set of services, the request comprising: an identifier associated with the client, the identifier being encrypted with the query key, a private portion of the request being encrypted with the query key, where the private portion of the request is shared only with services that have been authenticated by the authentication hardware server, and a public portion of the request, where the public portion of the request is shared with all services that can respond to the request regardless of authentication by the authentication hardware server; program instructions to, in response to ascertaining from the public portion of the request that it is able to respond to the request, respond to the edge service with (i) an identifier associated with one or more of the dynamic set of services, and (ii) the identifier associated with the client, where the identifier associated with the client is encrypted with the query key; program instructions to authenticate with the one or more of the dynamic set of services that the edge service is able to respond to the request by authenticating with the AS, where the AS provides a third ticket allowing the edge service to authenticate with the TGS, where the TGS provides a fourth ticket allowing a single service to authenticate with one or more of the dynamic set of services, where the edge service generates a session key using a one way function of a portion of the third ticket provided by the AS to allow the edge service to authenticate with the TGS; program instructions to send the query key, to the one or more of the dynamic set of services, encrypted using the session key; and program instructions to access a specific service from the one or more of the dynamic set of services by traversing through multiple intermediary services in order to reach the specific service, where at least one service from the multiple intermediary services provides access to the query key.

BRIEF DESCRIPTION OF THE SEVERAL VIEWS OF THE DRAWINGS

Preferred embodiments of the present invention will now be described in more detail, by way of example only, with reference to the accompanying drawings, in which.

DETAILED DESCRIPTION

One method of authentication in computer networks uses "tickets" to allow nodes communicating over a non-secure network to prove their identity to one another in a secure manner. Such a method provides mutual authentication. Both the user and the server verify each other's identity. An example of such a method is the Kerberos authentication protocol and embodiments of the present invention will be described using the Kerberos protocol. However, other implementations are possible using other authentication protocols.

Figure 1:
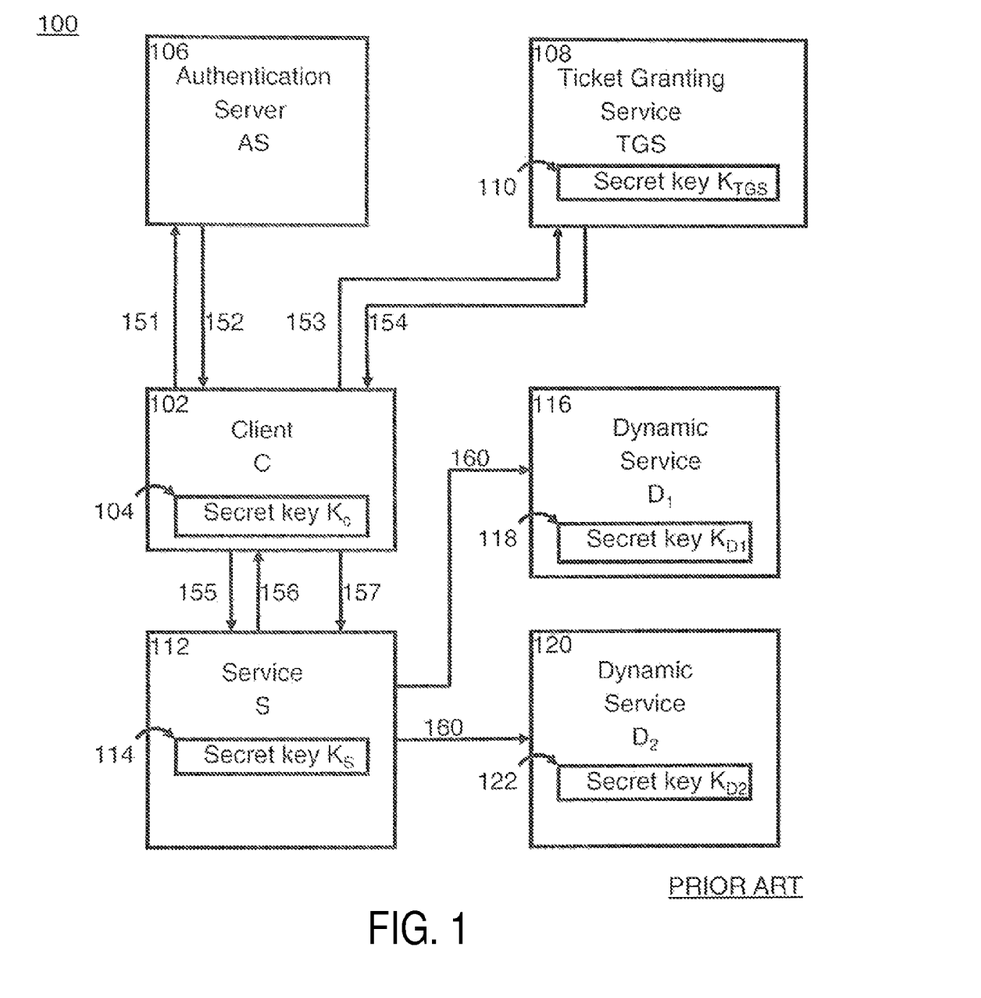
FIG. 1 shows a prior art Kerberos authentication protocol.

Referring to FIG. 1, a block diagram of a prior art implementation of the Kerberos protocol is shown. A client (C) 102 authenticates 151, 152 with an Authentication Server (AS) 106. The Client (C) 102 obtains 153, 154 a Ticket Granting Ticket (302 in FIG. 3) for an Edge Service (S) 112 from a Ticket Granting Service (TGS) 108. The Client (C) 102 then uses 155, 156 the ticket (302 in FIG. 3) to access the Edge Service (S) 112. The end result of these message exchanges in accordance with the Kerberos protocol is the establishment of a shared key between a Client (C) 102 and the Edge Service (S) 112. The Edge Service (S) 112 can be sure that the Client (C) 102 is genuine, and in standard deployments the Client (C) 102 can be sure that the Edge Service (S) 112 is genuine. The shared key can subsequently be used to sign or encrypt messages between the Client (C) 102 and the Edge Service (S) 112. These processes will be described in more detail below with reference to FIG. 2 to FIG. 5 of the accompanying drawings.

Client (C) 102 may also send 157 Edge Service (S) 112 the session key $K_{C,TGS}$ between the Client (C) 102 and the Ticket Granting Service (TGS) 108 in order to allow the Edge Service (S) 112 to request tickets (not shown in FIG. 1) from the Ticket Granting Service (TGS) 108 as if it were the Client (C) 102. These tickets allow the Edge Service (S) 112 to access 160 other Dynamic Services ($D_1 \ldots D_n$) 116, 120 as if it were the Client (C) 102. This process will be described in more detail below with reference to FIG. 6 of the accompanying drawings.

Interactions in the Kerberos protocol are typically described using the following notation:
$K_A$ A's secret key
$K_{A,B}$ Session key between A and B
$\{X\}_K$ X is encrypted with K
A δ B: M Message M sent from A to B
$N_X$ A cryptographic nonce (see below)
addr IP Address of principal
life Lifetime of ticket (typically implemented as start time and end time)

The messages described below have been simplified and do not include information such as the protocol version. For full specification of the messages, see Request for Comment (RFC) 1510 of The Internet Engineering Task Force (IETF).

In cryptography, a nonce (Number Once) is an arbitrary number used only once in a cryptographic communication. It is often a random or pseudo-random number issued in an authentication protocol to ensure that old communications cannot be reused in replay attacks. In embodiments of the present invention, the cryptographic nonce is generated by the message to sender, except for in Msg 6 below, where the manipulation of $N_S$ proves that Edge Service S 112 has been able to decrypt the cryptographic nonce contained in the previous message (Msg 5).

Accessing a Service Using the Kerberos Protocol

Before a client (C) 102 can access an Edge Service (S) 112, the Client (C) 102 must receive a Ticket Granting Ticket (TGT) from the Authentication Service (AS) 106. The Authentication Service (AS) 106 and the Client (C) 102 have a shared secret key $K_C$. This could be a one way function (typically a hash) of the Client's (C) 102 password. In another embodiment, the function could be more complex, such as a salted hash of the password. In a further embodiment, in a more complex 2-factor authentication environment, the shared secret key may be generated by data stored on a key card together with a password or a PIN. In a yet further embodiment, the shared secret key may be generated from a fingerprint or from a retina scan.

Figure 2:
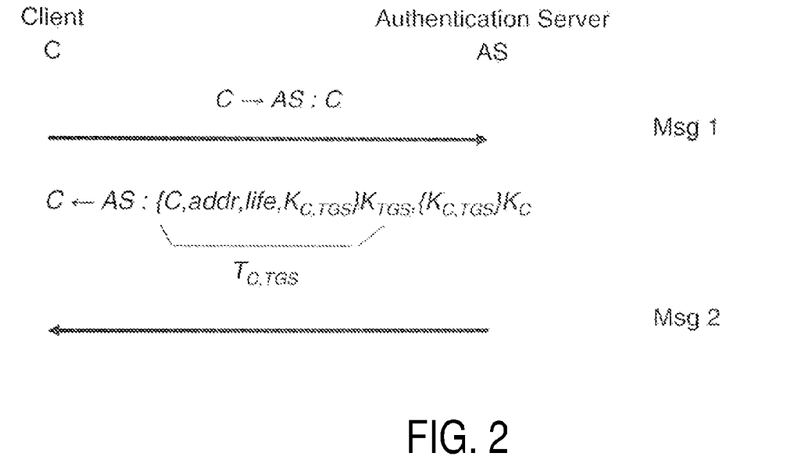
FIG. 2 shows a prior art message exchange between a Client and an Authentication Server in order for the client to obtain a Ticket Granting Ticket.

Referring to FIG. 2, to begin authentication, the Client (C) 102 sends (Msg 1) a cleartext Client Identifier (ID) to the Authentication Service (AS) 106.

CτAS:C (Msg 1)

Neither the secret key $K_C$ nor the Client's (C) 102 password is sent to the Authentication Server (AS) 106.

The Authentication Server (AS) 106 generates the Client's (C) 102 secret key $K_C$ by using a one way function (typically a hash) of the Client's (C) 102 password. In other embodiments, the secret key $K_C$ may be generated in other ways as described above. The Client's (C) 102 password is stored in a database accessible to the Authentication Server (AS) 106. If the Client (C) 102 and the Client's (C) 102 password are not stored in the database then no authentication takes place.

The Authentication Server (AS) 106 creates a Ticket Granting Ticket $T_{C,TGS}$ (302 in FIG. 3) by (i) taking the cleartext Client (C) Identifier that it received from the Client (C) 102, adding (ii) the IP address of the principal (addr), (iii) the lifetime of the ticket (life) and (iv) a session key $K_{C,TGS}$ generated by the Authentication server (AS) 106 for the Client (C) 102 to use to communicate with the Ticket Granting Service (TGS) 108. The principle referred to is the Authentication Server (AS) 106. The lifetime of the ticket (life) is typically implemented as a start time and an end time, but other variations may be used, such as an end time only. In another embodiment, the ticket may be renewable. It then encrypts this using the secret key $K_{TGS}$ of the Ticket Granting Service (TGS) 108. The Ticket Granting Service's (TGS) 108 secret key $K_{TGS}$ is stored in a database accessible to the Authentication Server (AS) 106.

The Authentication Server (AS) 106 also encrypts the session key $K_{C,TGS}$ generated by the Authentication Server (AS) 106 for the Client (C) 102 to use to communicate with the Ticket Granting Service (TGS) 108 using the Client's (C) 102 secret key $K_C$. It then sends (Msg 2) the encrypted Ticket Granting Ticket $T_{C,TGS}$ (302 in FIG. 3) together with the encrypted session key $K_{C,TGS}$ to the Client (C) 102.

$$C \rho AS : \{C, addr, life, K_{C,TGS}\}K_{TGS}, \{K_{C,TGS}\}K_C \quad (Msg\ 2)$$
$$\underbrace{B\phantom{xxxxxxxxxxxxxxxxx}A}_{T_{C,TGS}}$$

The Client (C) 102 decrypts the encrypted session key $K_{C,TGS}$ using its secret key $K_C$. The session key $K_{C,TGS}$ is used to secure communication between the Client (C) 102 and the Ticket Granting Service (TGS) 108. The Ticket Granting Service (TGS) 108 allows the Client (C) 102 to request tickets for specific services, and is typically physically or logically on the same machine as the Authentication Service (AS) 106.

Figure 3:
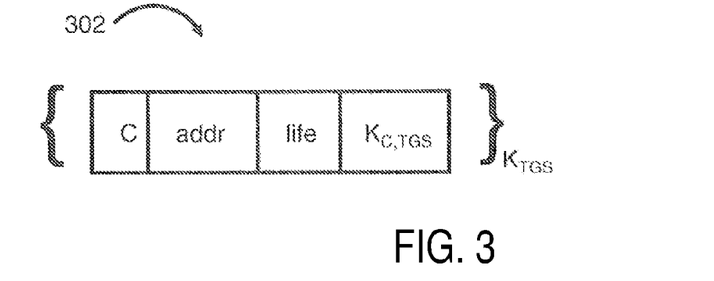
FIG. 3 shows a prior art Ticket Granting Ticket.

$T_{C,TGS}$ is a Ticket Granting Ticket (TGT) encrypted with the secret key ($K_{TGS}$) of the Ticket Granting Service (TGS) 108. The client (C) 102 cannot decrypt this as it does not have the secret key of the TGS ($K_{TGS}$), but during the lifetime of the Ticket Granting Ticket (TGT) (the default for Kerberos is 5 minutes) it allows the client to access services without re-authenticating (e.g. without re-entering a password).

Figure 4:
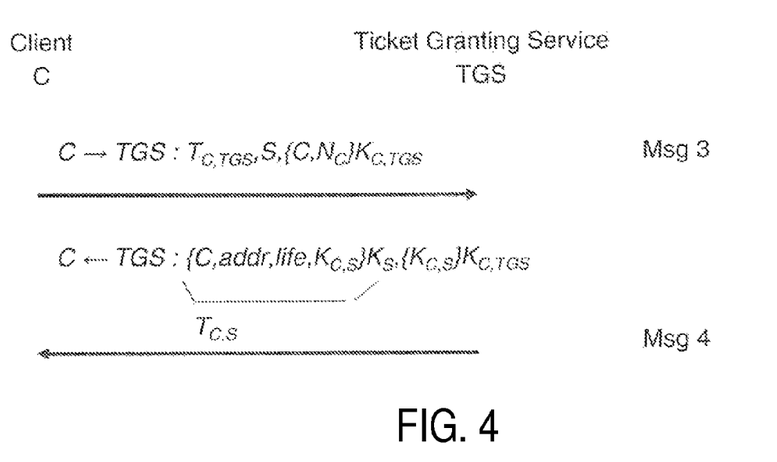
FIG. 4 shows a prior art message exchange between a Client and a Ticket Granting Service in order for the client to obtain a Service Ticket.

Referring to FIG. 4, in order to access a service, the Client (C) 102 sends a message to the Ticket Granting Service (TGS) 108. The message comprises (i) the encrypted Ticket Granting Ticket $T_{C,TGS}$ (302 in FIG. 3) and (ii) a cleartext Service Identifier (S). The client (C) 102 encrypts (iii) a Client Identifier (C) and (iv) a Client cryptographic nonce ($N_G$) using the session key $K_{C,TGS}$ generated by the Authentication Server (AS) 106 for the Client (C) 102 and adds these to portions (i) and (ii) of the message. The Client (C) 102 then sends (Msg 3) this message to the Ticket Granting Service (TGS) 108.

$$C \tau TGS: T_{C,TGS}, S, \{C, N_C\}K_{C,TGS} \quad (Msg\ 3)$$

Upon receiving the message from the Client (C) 102, the Ticket Granting Service (TGS) 108 extracts the Ticket Granting Ticket $T_{C,TGS}$ (which was earlier encrypted by the Authentication Server (AS) 106 using the Ticket Granting Service's (TGS) secret key $T_{TGS}$) from the message and decrypts it using its secret key $K_{TGS}$. The Ticket Granting Service (TGS) 108 then uses the Ticket Granting Ticket $T_{C,TGS}$ to decrypt the Client Identifier (C) and the Client cryptographic nonce (NO.

The Ticket Granting Service (TGS) 108 creates a Client Service Ticket $T_{C,S}$ by (i) taking the Client Identifier ID (C) that it received from the Client (C) 102, adding (ii) the IP address of the principal (addr), (iii) the lifetime of the ticket (life) and (iv) a session key $K_{C,S}$ generated by the Ticket Granting Service (TGS) 108 for the Client (C) 102 to use to communicate with the Edge Service (S) 112. The principle referred to is the Ticket Granting Service (TGS) 108. The lifetime of the ticket (life) is typically implemented as a start time and an end time, but other variations may be used, such as an end time only or a renewable ticket, as described above. It then encrypts this using the secret key $K_S$ of the Edge Service (S) 112. The Services's (S) 112 secret key $K_S$ is stored in a database accessible to the Ticket Granting Service (TGS) 108.

The Ticket Granting Service (TGS) 108 also encrypts the session key $K_{C,S}$ generated by the Ticket Granting Service (TGS) 108 for the Client (C) 102 to use to communicate with the Edge Service (S) 112 using session key $K_{C,TGS}$. It then sends (Msg 4) the encrypted Client Service Ticket $T_{C,S}$ together with the encrypted session key $K_{C,S}$ to the Client (C) 102.

$$C \rho TGS : \{C, addr, life, K_{C,S}\}K_S, \{K_{C,S}\}K_{C,TGS} \quad (Msg\ 4)$$
$$\underbrace{B\phantom{xxxxxxxxxxxxxxxxx}A}_{T_{C,S}}$$

Upon receiving Msg 4, the Client (C) 102 has enough information to authenticate itself to the Edge Service (S) 112.

Figure 5:
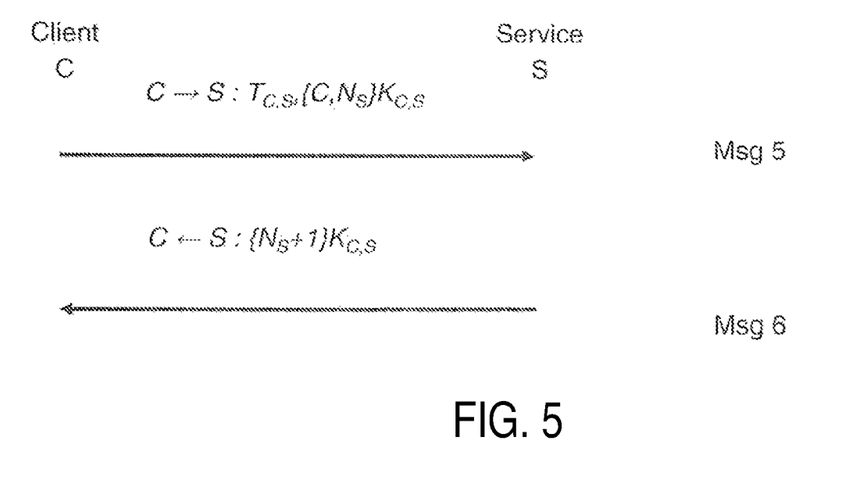
FIG. 5 shows a prior art message exchange between a Client and a Service in order for them to mutually authenticate each other.

Referring to FIG. 5, in order to authenticate itself with an Edge Service (S) 112, the Client (C) 102 sends a message to the Edge Service (S) 112. The message comprises (i) the encrypted Client Service Ticket $T_{C,S}$. The client (C) 102 encrypts (ii) a Client Identifier (C) and (iii) a Service cryptographic nonce ($N_S$) using the encrypted session key $K_{C,S}$ generated by the Ticket Granting Service (TGS) 108 for the Client (C) 102 and adds these to portion (i) of the message. The Client (C) 102 then sends (Msg 5) this message to the Edge Service (S) 112.

$$C \tau S: T_{C,S}, \{C, N_S\}K_{C,S} \quad (Msg\ 5)$$

The Edge Service (S) 112 decrypts the message using the session key $K_{C,S}$ generated by the Ticket Granting Service (TGS) 108 in order to obtain the Client (C) Identifier and the Service cryptographic nonce $N_S$. The Edge Service (S) 112 then takes the Service cryptographic nonce Ns and increments it. The Service cryptographic nonce $N_S$ is incremented in order that the Client (C) 102 can later determine that the cryptographic nonce $N_S$ is correctly updated and that the Client (C) 102 can trust the Edge Service (S) 112. It encrypts the incremented cryptographic nonce $N_S$ using the session key $K_{C,S}$ generated by the Ticket Granting Service (TGS) 108 and then sends (Msg 6) the encrypted incremented Service cryptographic nonce $N_S+1$ to the Client (C) 102. Mutual authentication of C and S is obtained at this point.

$$C \rho S: \{N_S+1\}K_{C,S} \quad (Msg\ 6)$$

The Client (C) 102 decrypts the encrypted incremented Service cryptographic nonce $N_S+1$ using the session key $K_{C,S}$. As mentioned above, the Client (C) 102 checks whether the Service cryptographic nonce $N_S$ is correctly updated and whether the Client (C) 102 can trust the server.

Credential Delegation

Figure 6:
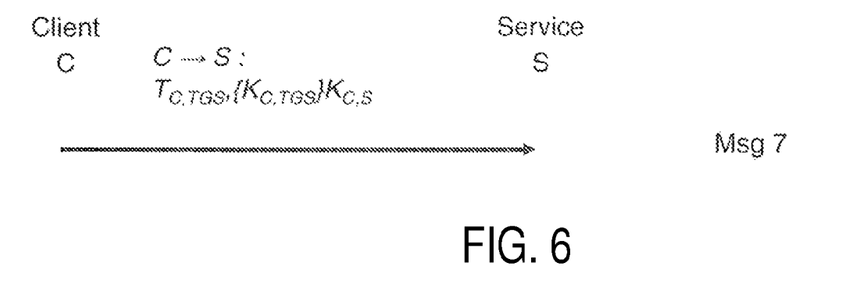
FIG. 6 shows a prior art message from a Client to a Service in order to delegate the Client's credentials to an authenticated Service.

Kerberos version 5 allows a Client (C) 102 to delegate his/her credentials to an authenticated Edge Service (S) 112. The Edge Service (S) 112 can then access other Services $(D_1 \ldots D_n)$ 116, 120 as if it were the Client (C) 112. In order for an Edge Service (S) 112 to request a ticket for another Service $(D_1 \ldots D_n)$ 116, 120, it must be able to communicate with the Ticket Granting Service (TGS) 108, that is, it must know the session key $K_{C,TGS}$ between the Client (C) 102 and the Ticket Granting Service (TGS) 108. This session key can be obtained using Msg 7 below, described in section 5.8 of RFC 1510, referred to above.

Referring to FIG. 6, in order to delegate its credentials to an authenticated Edge Service (S) 112, the Client (C) 102 sends a message to the Edge Service (S) 112. The message comprises (i) the encrypted Ticket Granting Ticket $T_{C,TGS}$ (302 in FIG. 3). The client (C) 102 encrypts (ii) the session key $K_{C,TGS}$ generated by the Authentication Server (AS) 106 for the Client (C) 102 to use to communicate with the Ticket Granting Service (TGS) 108 using the session key $K_{C,S}$ generated by the Edge Service (S) 112 for the Client (C) 102 and adds this to portion (i) of the message. The Client (C) 102 then sends (Msg 7) this message to the Edge Service (S) 112.

$$C \tau S : T_{C,TGS}\{K_{C,TGS}\}K_{C,S} \qquad \text{(Msg 7)}$$

Now the Edge Service (S) 112 can use the Ticket Granting Ticket $T_{C,TGS}$ to request tickets from the Ticket Granting Service (TGS) 108 as described in Msg 3 and Msg 4 above. Normally the Ticket Granting Service (TGS) 108 would reject a request from an address which does not match that within the Ticket Granting Ticket $T_{C,TGS}$, but if the FORWARDABLE flag is set, it can ignore this discrepancy.

Credential Delegation with Dynamic Authentication

Embodiments of the present invention extend the ticketing framework (such as the Kerberos framework) to provide the delegated credentials 'on demand' for nodes that can respond to the service request. In a traditional ticketing framework (such as Kerberos), a requesting Edge Service (S) 112 must know and obtain tickets for all Services $(D_1 \ldots D_n)$ 116, 120 that could respond in advance of making the request. Embodiments of the present invention remove this requirement, and instead provide a method, system and computer program whereby tickets are obtained for a specific Service $(D_1 \ldots D_n)$ 116, 120 only if it is known that it can handle a request.

In embodiments of the present invention a query is split into a public portion and a private portion. The public portion is shared with all Services $(D_1 \ldots D_n)$ 116, 120 that could respond to the request (this is how an individual Service $(D_1 \ldots D_n)$ 116, 120 can ascertain whether it could respond to a request), whereas the private portion is shared only with those Services $(D_1 \ldots D_n)$ 116, 120 that have authenticated with the Authentication Server (AS) 112.

A shared key is established between the Client (C) 102 and the set of Services $(D_1 \ldots D_n)$ 116, 120 that could respond to a specific request. Client (C) 102 identity assurance is provided at either the edge of a trusted network or throughout the trusted network.

When dealing with an unknown set of Services $(D_1 \ldots D_n)$ 116, 120, it may not be the case that all Services $(D_1 \ldots D_n)$ 116, 120 are trustworthy. If the request contains sensitive information, it should not be shared with any untrusted Service $(D_1 \ldots D_n)$ 116, 120. However, a Service $(D_1 \ldots D_n)$ 116, 120 cannot determine whether it can respond to a request if the request is hidden. For this reason, in embodiments of the present invention, the request is split into two parts, a public portion $R_{pub}$ which all Services $(D_1 \ldots D_n)$ 116, 120 can see, and a private portion $R_{priv}$ which only authenticated Services $(D_1 \ldots D_n)$ 116, 120 can see.

The "GaianDB" Database referred to above provides a good example of a request that can be split in this way: an SQL query. Consider the query:

SELECT * FROM PEOPLE WHERE NAME='doe'

This could easily be split into $R_{pub}$:

SELECT * FROM PEOPLE

Upon receiving this query, only GaianDB services that had a PEOPLE table would need access to $R_{priv}$:

WHERE NAME='doe'

Embodiments of the present invention dynamically authenticate the Services $(D_1 \ldots D_n)$ 116, 120 as a request is being processed. It is assumed that the Client (C) 102 has authenticated initially with a single Edge Service (S) 112 using a standard protocol (Msg 1 to Msg 6) such as Kerberos.

Figure 7:
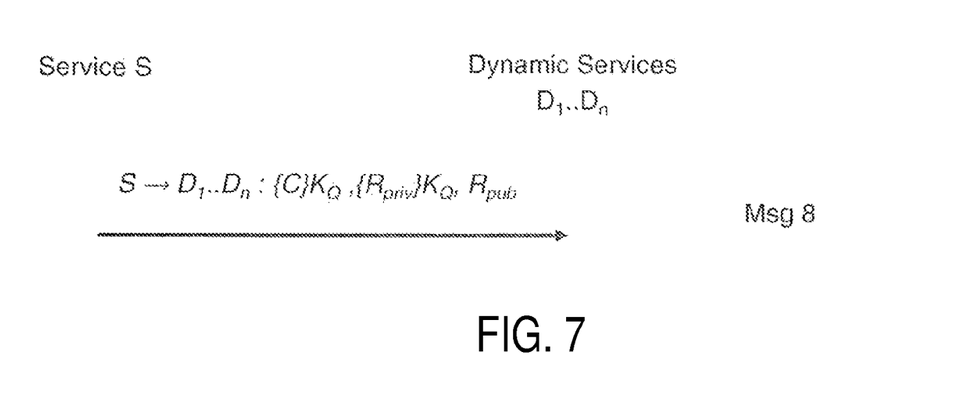
FIG. 7 shows a message from an authenticated Service to a dynamic set of Services on behalf of a client.

Referring to FIG. 7, a message is sent from this Edge Service (S) 112 to a dynamic set of Services $(D_1 \ldots D_n)$ 116, 120. The Edge Service (S) 112 encrypts (i) a Client Identifier (C) using a query key $K_Q$ and (ii) the private portion of the query $R_{priv}$ using the same query key $K_Q$. The Edge Service (S) 112 adds (iii) the unencrypted public portion of the query $R_{pub}$ and sends (Msg 8) this message to the Services $(D_1 \ldots D_n)$ 116, 120.

$$S \tau D_1 \ldots D_n : \{C\}K_Q, \{R_{priv}\}K_Q, R_{pub} \qquad \text{(Msg 8)}$$

This message makes use of a query key $K_Q$ that is generated by the issuer of the request, that is the Client (C) 102. Typically, this is generated by applying a one-way function to $K_{C,TGS}$. In another embodiment, this is generated randomly for each request. This means that each Client (C) 102 will have its own query key $K_Q$, and the expiry of the query key $K_Q$ and the Ticket Granting Ticket (TGT) will be linked. The same query key $K_Q$ may be used for multiple requests, and Services $(D_1 \ldots D_n)$ 116, 120 responding to a request can cache the query key $K_Q$. In some embodiments, caching of the query key $K_Q$ may not be permitted.

$R_{priv}$ has been encrypted with the query key $K_Q$, so initially none of the Services $(D_1 \ldots D_n)$ 116, 120 will be able to decrypt it as they will not have the query key $K_Q$. A subset D' of the Services $(D_1 \ldots D_n)$ 116, 120, will be able to ascertain that they could respond to the request based on information in the public portion $R_{pub}$.

Figure 8:
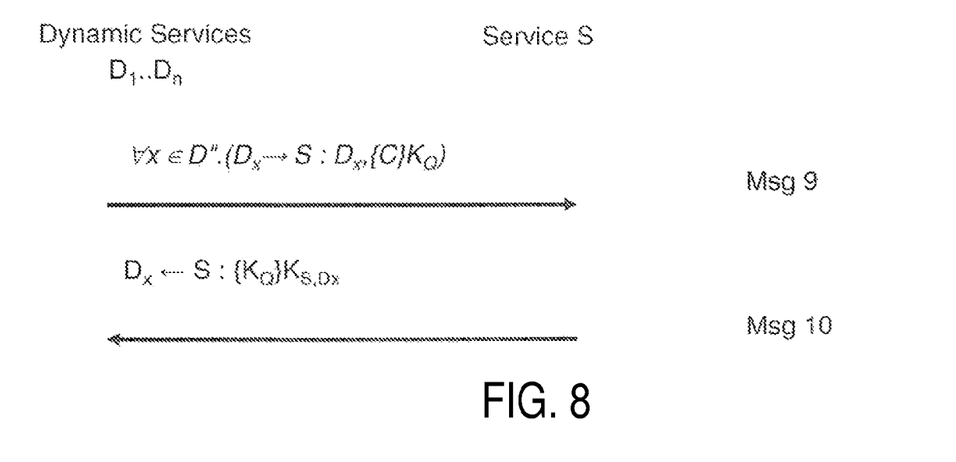
FIG. 8 shows a message exchange between one of the set of dynamic Services and the authenticated Service requesting and supplying a query key $K_Q$.

A subset, D", of these services D', will not have $K_Q$ cached from a previous request and will need to obtain it from the issuer of the request:

Referring to FIG. 8, for all the services that belong to the group of services D" ($\forall x \chi D$), that is all the services that do not have the query key cached, the service $D_X$ sends (Msg 9) to Service S, (i) a message with the identifier of the service $D_X$ together with (ii) the Client Identifier, the Client Identifier being encrypted with the query key $K_Q$. Although Service S does not have the query key $K_Q$, it has the Client Identifier (C) encrypted using the query key $K_Q$ that it received in Msg 8. This message allows the Service S to know which service wants the query key $K_Q$ for which client.

$$\forall x \chi D":(D_x \tau S:D_x,\{C\}K_Q) \qquad \text{(Msg 9)}$$

The issuer of the request, the Edge Service (S) 112, can then go through the standard steps (Msg 3 and Msg 4 referred to above) of requesting a ticket for Service $D_X$ 116, 120, including a session key $K_{S,Dx}$ for the session between the Edge Service (S) 112 and the Service $D_X$ 116, 120, and then authenticating (Msg 5 and Msg 6 referred to above) with the Service $D_X$ 116, 120. During this process, the Services S 112 and $D_X$ 116, 120 will mutually authenticate each other, ensuring that the query key $K_Q$ is protected.

The issuer of the request, Edge Service (S) 112, encrypts (i) the query key $K_Q$ using a session key $K_{S,Dx}$ for the session between the Edge Service (S) 112 and the Service $(D_X)$ 116, 120 and sends (Msg 10) this message to the Service $(D_X)$ 116, 120.

$$D_x \rho S:\{K_Q\}K_{S,Dx} \qquad \text{(Msg 10)}$$

The Service $D_X$ 116, 120 decrypts the received message using session key $K_{S,Dx}$ to obtain the query key $K_Q$. The Service $D_X$ 116, 120 then uses the query key $K_Q$ to decrypt $R_{priv}$ (sent to the Service $D_X$ 116, 120 in Msg 8) and to ascertain whether it can respond to the request. If the response to the request sent to Edge Service (S) 112 is sensitive, this response may be encrypted by the Service $D_X$ 116, 120 with $K_Q$. If it is not sensitive, it may be sent in cleartext.

The method described above also works when there is only a public portion $R_{pub}$ of the query and no private portion $R_{priv}$ of the query. The propagation of the query key $K_Q$ from the Edge Service (S) 112 to the Services $D_1 \ldots D_n$ 116, 120 establishes a trusted path from the Services $D_1 \ldots D_n$ 116, 120 back to the issuer (Edge Service (S) 112). The method described above also works when there is no public portion $R_{pub}$ of the query, only a private portion $R_{priv}$ of the query, in which case all Services $D_1 \ldots D_n$ 116, 120 will request the query key $K_Q$ in order to decrypt the private portion $R_{priv}$ of the query.

Efficient Query Key $K_Q$ Propagation in a Network of Services

Figure 9:
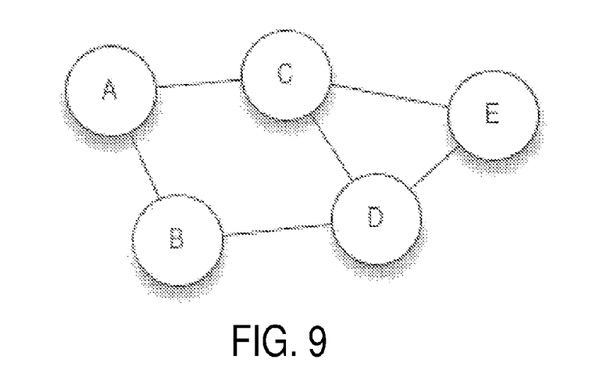
FIG. 9 shows a dynamic network having intermediate services, embodiments of the present invention being able to be practised in the dynamic network.

In some embodiments of the method described above, all the Services $D_1 \ldots D_n$ 116, 120 that could respond to a request are connected directly to the Edge Service (S) 112 issuing the request. In dynamic networks, there may be one or more intermediate services through which the request passes, as shown in FIG. 9.

Consider now a request R from Service A, where all the services have data relevant to the query. Using the embodiment described above, Service A would be contacted by Services B, C, D and E to obtain the query key $K_Q$. The number of Services contacting Service A scales linearly with the number of Services in the network that have data relevant to the query. In another embodiment, this situation can be improved by allowing intermediate Services knowing the query key $K_Q$ to pass the query key $K_Q$ downstream.

In order to reach a specific Service, the request R will need to have travelled through a sequence of Services. For example, to get to Service E, some possible paths for the request R would be (Service A, Service C, Service E) or (Service A, Service B, Service D, Service E).

Figure 10:
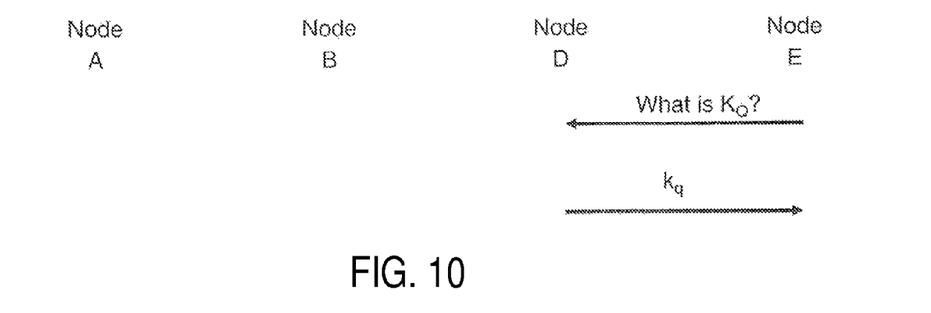
FIG. 10 shows a message exchange between a service and an intermediate service requesting and supplying a query key $K_Q$.

If Service E needs to obtain the query key $K_Q$, it can ask the prior Service in the sequence (for example, Service D) to supply it. The prior Service then has several options:

1. Referring to FIG. 10, if the prior Service (Service D) knows the query key $K_Q$, it can pass it downstream to Service E using the mechanism described above.

Figure 11:
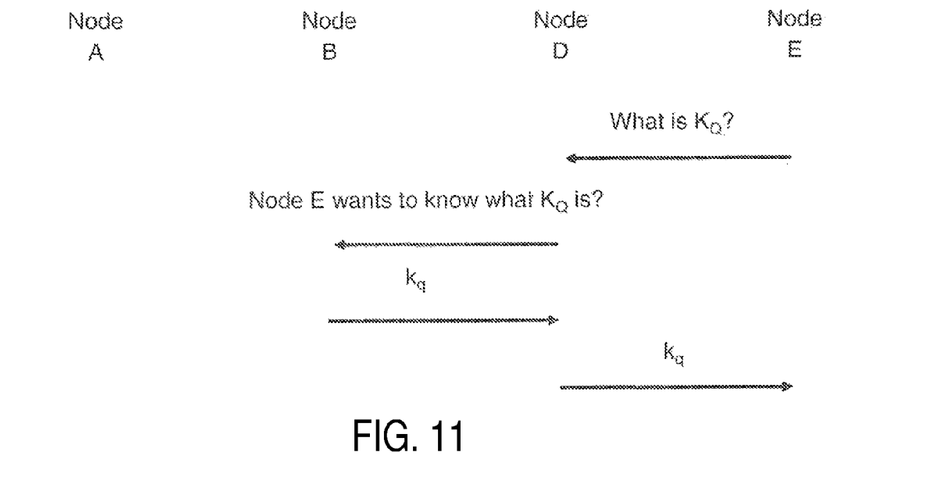
FIG. 11 shows a message exchange between a service and two intermediate services requesting and supplying a query key $K_Q$.

2. Referring to FIG. 11, if the prior Service (Service D) does not know the query key $K_Q$, and does not want to find it out (because it doesn't itself have any data relevant to the query), the prior Service (Service D) can forward the request for the query key $K_Q$ upstream to prior Service (Service B), and the prior service (Service D) can act merely as a conduit for the ensuing transportation of the query key $K_Q$. This embodiment also works where the prior service (Service D) is not trusted, because query key $K_Q$ is encrypted during transportation and prior service (Service D) does not have the key (the session key $K_{S,De}$) that is necessary to decrypt the query key $K_Q$. Because of this, there is no security risk introduced by routing the encrypted query key $K_Q$ through untrusted service (Service D).

Figure 12:
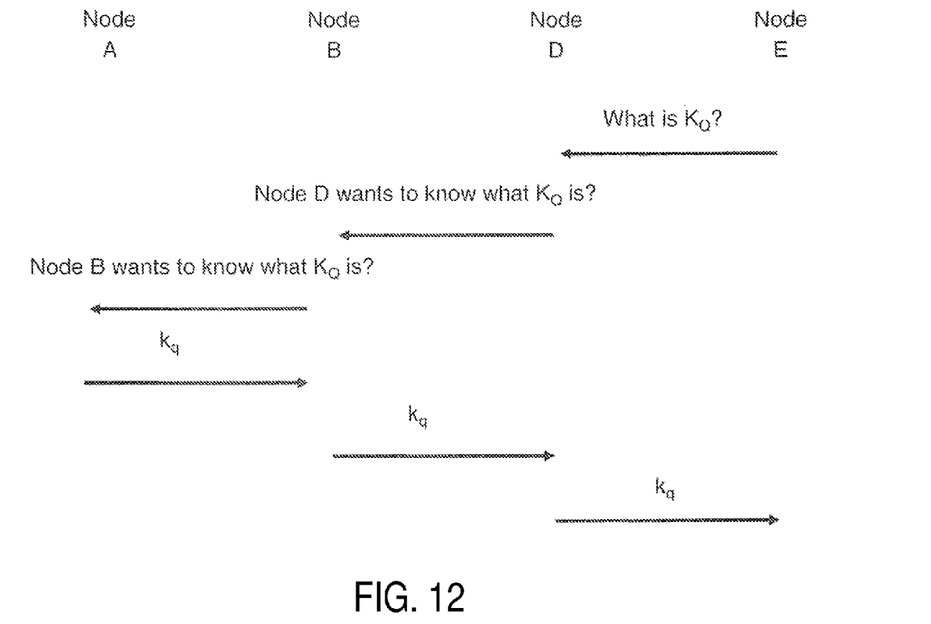
FIG. 12 shows a message exchange between a service, two intermediate services and the issuing service requesting and supplying a query key $K_Q$.

3. Referring to FIG. 12, if the prior Service (Service D) does not know the query key $K_Q$ and would like to obtain it, the prior Service (Service D) can make its own request upstream (to prior Service B and perhaps to prior Service A) to obtain the query key $K_Q$. Once the query key has been received by prior Service (Service D), provision of the query key $K_Q$ can then proceed as in option 1.

Following the sequence above, if the intermediate services do not know the query key $K_Q$, the request for the query key $K_Q$ may eventually reach the issuing node (Service A), which will always know $K_Q$.

Delegation of Authority Through the Network

A service $D_{1-n}$ 116, 120 in the dynamic network may need to be provided with the credentials of the Client (C) 102 in order to process a request (for example, to access a back-end data source). To achieve this, the method described above may be used, but in addition to passing $K_Q$ as in Msg 10, the data from Msg 7 should also be passed.

Figure 13:
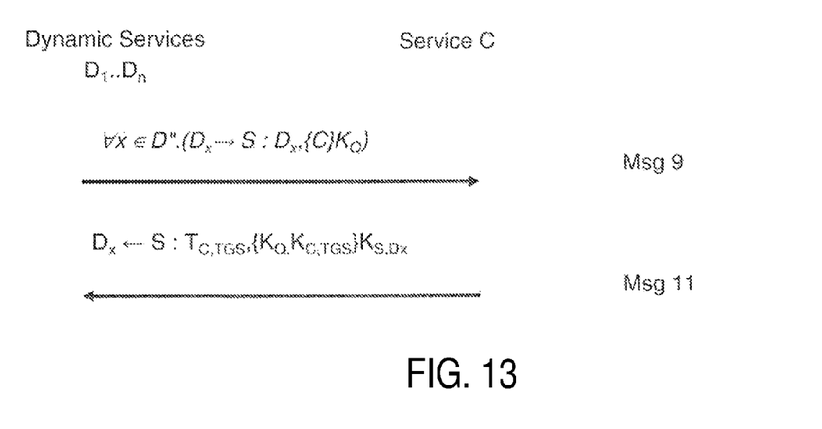
FIG. 13 shows a message from a service to one of a set of dynamic services in order to delegate the Client's credentials to the dynamic service.

Referring to FIG. 13, the issuer of the request, Edge Service (S) 112, sends a message to the Service $D_X$ 116, 120. The message comprises (i) the Ticket Granting Ticket $T_{C,TGS}$ (302 in FIG. 3). The Edge Service (S) 112 encrypts (ii) the query key $K_Q$ and the session key $K_{C,TGS}$, generated by the Authentication Server (AS) 106 for the Client (C) 102 to use to communicate with the Ticket Granting Service (TGS) 108, using the session key $K_{S,Dx}$ generated by the Edge Service (S) 112 for the Service $D_X$ 116, 120. The Edge Service (S) 112 then sends (Msg 13) this message to the Service $D_X$ 116, 120.

$$D_x \rho S:T_{C,TGS}\{K_Q\},K_{C,TGS}\}K_{S,Dx} \qquad \text{(Msg 11)}$$

The Service $D_X$ 116, 120 then uses the session key $K_{S,Dx}$ to decrypt the query key $K_Q$ and the session key $K_{C,TGS}$. These, together with the Ticket Granting Ticket $T_{C,TGS}$ (302 in FIG. 3) allow the Service $D_X$ to process requests to other services on behalf of the Client (C) 102. This method works with either of the key propagation schemes described above.

An additional benefit of this embodiment is that downstream services are authenticating with the Client (C) 112 directly. This has the advantage that it prevents an upstream service from spoofing a different Client (C) 112. This is described in more detail with reference to potential attack 4 below.

Analysis of Potential Attacks

Listed below are some potential attacks against the method described above and ways in which the effects of these potential attacks may be mitigated.

1. An untrusted service modifies the request in transit: In the embodiments described above, an untrusted service through which the request is routed could alter the request that is being executed. This attack vector can be removed by generating a Message Integrity Code (MIC) using the query key, and appending this to the end of the message. A trusted service can then use this Message Integrity Code (MIC) to verify that the query has not been tampered with.

2. A trusted service modifies the query in transit: It is not possible to defend against this attack. This is similar to the case in a ticketing framework, such as Kerberos, where a service that has had a user's credentials delegated to it misuses these. One of the reasons why a query key $K_Q$ is generated rather than using the session key $K_{C,TGS}$ is to limit the possible damage from this scenario to the particular query, rather than the entire session.

3. An untrusted service generates a query with a fake query key $K_Q$: The defense against this attack is based on the inter-node authentication that is performed when obtaining the query key $K_Q$. When a service receives the request, it will attempt to establish a secure connection with the query issuer to obtain a session key to transport the query key $K_Q$. At this point, the Ticket Granting Service (TGS) 108 would not allow the connection to be established with the untrusted service.

4. A trusted node spoofs a query from a different Client (C) 112: A trusted service can generate a fake query key $K_Q$ for an arbitrary Client (C) 102 and then send out a request posing as that Client (C) 102. This attack is not possible in a standard framework ticketing framework, such as the Kerberos protocol. There are several possible ways to mitigate it:

a: Turn on credential delegation. This means that a downstream service can require current credentials for a Client (C) 102 to be delegated before acting as that Client (C) 102.

b. Incorporate Public-key infrastructure (PKI). A request could be signed with the private key of a Client (C) 102, and then verified on the downstream service using the public key of that Client (C) 102.

c. Use the session key $K_{C,TGS}$ directly rather than the query key $K_Q$, and verify this with the Ticket Granting Service (TGS) 108.

5. A service pretends that it can respond to a query when it can't. The main reason for including a stage where a service decides whether it can respond to a query are:

a) to reduce network traffic and minimise the load on the Ticket Granting Service (TGS) 108; and     b) to honor the 'need to know' security best practice.

Even if a service pretends that it could respond to a query when it can't, an untrusted service will not be able to obtain the query key $K_Q$, because establishment of the secure connection will be denied.

6. A trusted service generates a query using a cached query key $K_Q$: If a service is compromised while it has a query key $K_Q$ cached, it can issue queries to other services that have the same query key $K_Q$ cached even if its status is changed to untrusted by the Ticket Granting Service (TGS) 108. This attack would only be possible for the lifetime of the cache, and could be mitigated by forbidding the caching of query keys $K_Q$.

Embodiments of the invention can take the form of a computer program accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-RW), and DVD.

Thus, as described herein, embodiments of the invention provide a method for secure user authentication in a network having a dynamic set of services $D_1 \ldots D_n$, the method comprising: a client C authenticating with an edge service S; a client C generating a query key $K_Q$; the edge service S issuing a request (Msg 8) to the dynamic set of services $D_1 \ldots D_n$, the request comprising (i) an identifier associated with the client C, the identifier being encrypted with a query key $K_Q$, (ii) a private portion $R_{priv}$ of the request being encrypted with a query key $K_Q$ and (iii) a public portion $R_{pub}$ of the request; one or more of said dynamic set of services $D_1 \ldots D_n$, having ascertained from said public portion $R_{pub}$ of the request that it is able to respond to the request, responding (Msg 9) to the edge service S with (i) an identifier $D_x$ associated with the one or more of said dynamic set of services $D_1 \ldots D_n$, and (ii) the identifier associated with the client C, this identifier being encrypted with the query key $K_Q$; the edge service S authenticating with the one or more of said dynamic set of services $D_1 \ldots D_n$, that is able to respond to the request, including generating a session key $K_{S,Dx}$; and the edge service S sending (Msg 10) the query key $K_Q$ to said one or more of said dynamic set of services $D_1 \ldots D_n$, encrypted using a session key $K_{S,Dx}$.

By having a public portion $R_{pub}$ and a private portion $R_{priv}$ of the request, with only authenticated services being able to see the private portion, but the public portion being sufficient for all services to determine whether they can respond to a request, the request can be easily distributed to a dynamic set of services without the bottleneck of each of the dynamic set of services having to be authenticated regardless of whether any of the dynamic set of services can respond to the query. Only those dynamic services which can respond to a query are authenticated.

In a preferred embodiment, the client C authenticates with an edge service S by authenticating with an Authentication Server, which provides a ticket $T_{C,TGS}$ allowing the client C to authenticate with a Ticket Granting Service, which provides a ticket $T_{C,S}$ allowing the client to authenticate with the edge service S.

In a further preferred embodiment, the client C generates a query key $K_Q$ using a one way function of a portion $K_{C,TGS}$ of the ticket $T_{C,TGS}$ provided by the Authentication Server to allow the client C to authenticate with the Ticket Granting Service.

In a preferred embodiment, the edge service S authenticates with one or more of said dynamic set of services $D_1 \ldots D_n$ by authenticating with an Authentication Server, which provides a ticket $T_{S,TGS}$ allowing the edge service S to authenticate with a Ticket Granting Service, which provides a ticket $T_{S,Dx}$ allowing the single service to authenticate with one or more of said dynamic set of services $D_1 \ldots D_n$.

In a further preferred embodiment, the edge service S generates the session key $K_{S,Dx}$ using a one way function of a portion $K_{S,TGS}$ of the ticket $T_{C,TGS}$ provided by the Authentication Server to allow the edge service S to authenticate with the Ticket Granting Service.

In a preferred embodiment, the one or more of said dynamic set of services $D_1 \ldots D_n$ caches the query key $K_Q$ from a request for use with a future request from the same client C.

This has the advantage of improved performance as the query key $K_Q$ does not have to be requested by the dynamic service for subsequent queries from the same client, whilst the dynamic service remains authenticated.

In a preferred embodiment, the query key $K_Q$ is sent to said one or more of said dynamic set of services $D_1 \ldots D_n$, encrypted using a session key $K_{S,Dx}$ by another one or more of said dynamic set of services $D_1 \ldots D_n$.

This has the advantage that all of the requests by multiple dynamic services for the query key $K_Q$ do not have to be handled by the edge service, but instead can be handled by intermediate services in the network.

Embodiments of the present invention also provide an apparatus for secure user authentication in a network, the apparatus comprising: an edge service S; a client C which authenticates with the edge service S and generates a query key $K_Q$; a dynamic set of services $D_1 \ldots D_n$; wherein the edge service S issues a request to the dynamic set of services $D_1 \ldots D_n$, the request comprising (i) an identifier associated with the client C, the identifier being encrypted with a query key $K_Q$, (ii) a private portion $R_{priv}$ of the request being encrypted with a query key $K_Q$ and (iii) a public portion $R_{priv}$ of the request; wherein the one or more of said dynamic set of services $D_1 \ldots D_n$, having ascertained from said public portion $R_{pub}$ of the request that it is able to respond to the request, responds to the edge service S with (i) an identifier $D_x$ associated with the one or more of said dynamic set of services $D_1 \ldots D_n$, and (ii) the identifier associated with the client C, this identifier being encrypted with the query key $K_Q$; wherein the edge service S authenticates with the one or more of said dynamic set of services $D_1 \ldots D_n$, that is able to respond to the request, including generating a session key $K_{S,Dx}$; and wherein the single service S sends the query key $K_Q$ to said one or more of said dynamic set of services $D_1 \ldots D_n$, encrypted using a session key $K_{S,Dx}$.

Embodiments of the invention can take the form of a computer program accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-RW), and DVD.

What is claimed is:

1. A method for secure user authentication in a network having a dynamic set of services, the method comprising:
   a hardware client computer authenticating with an edge service by authenticating with an Authentication Server (AS) that provides a first ticket allowing the hardware client computer to authenticate with a Ticket Granting Service (TGS), wherein the TGS provides a second ticket allowing the hardware client computer to authenticate with the edge service;
   the hardware client computer generating a query key using a one way function of a portion of the first ticket provided by the AS to allow the hardware client computer to authenticate with the TGS;
   an authentication hardware server that authenticates an edge service that issues a request to the dynamic set of services, the request comprising:
     an identifier associated with the hardware client computer, the identifier being encrypted with the query key,
     a private portion of the request being encrypted with the query key, wherein the private portion of the request is shared only with services that have been authenticated by the authentication hardware server, and
     a public portion of the request, wherein the public portion of the request is shared with all services that can respond to the request regardless of authentication by the authentication hardware server;
   a hardware network having a dynamic set of services, wherein one or more of said dynamic set of services, in response to ascertaining from said public portion of the request that the one or more of said dynamic set of services is able to respond to the request, respond to the edge service with (i) an identifier associated with the one or more of said dynamic set of services, and (ii) the identifier associated with the hardware client computer, wherein the identifier associated with the hardware client computer is encrypted with the query key; wherein the edge service authenticates with the one or more of said dynamic set of services that the edge service is able to respond to the request by authenticating with the AS, wherein the AS provides a third ticket allowing the edge service to authenticate with the TGS, wherein the TGS provides a fourth ticket allowing a single service to authenticate with one or more of said dynamic set of services, wherein the edge service generates a session key using a one way function of a portion of the third ticket provided by the AS to allow the edge service to authenticate with the TGS; and wherein the edge service sends the query key, to said one or more of said dynamic set of services, encrypted using the session key; and
   accessing, by one or more processors, a specific service from said one or more of the dynamic set of services by traversing through multiple intermediary services in order to reach the specific service, wherein at least one service from said multiple intermediary services provides access to the query key.

2. The method as claimed in claim 1, wherein the one or more of said dynamic set of services caches the query key from a request for use with a future request from the hardware client computer.

3. The method as claimed in claim 1, wherein the query key is sent, to said one or more of said dynamic set of services, encrypted using the session key by another one or more of said dynamic set of services.

4. The method as claimed in claim 1, further comprising:
   mitigating attacks against said dynamic set of services by:
     modifying, by an untrusted service, the request while in transit by removing an attack vector in the request;
     spoofing, by a trusted service, a fake query from an arbitrary client computer that is different from said hardware client computer, wherein said trusted service:
       generates a fake query key KQ for the arbitrary client computer and sends out a request posting as the arbitrary client computer; and
       turns on a credential delegation such that a downstream service requires current credentials for the arbitrary client computer to be delegated before the arbitrary client computer can act as the arbitrary client computer;

pretending, by the untrusted service, to respond to the fake query, wherein the untrusted service is unable to respond to the fake query; and generating, by the trusted service, a query using a cached copy of the query key that was generated by the hardware client computer.

5. A computer program product for secure user authentication in a network having a dynamic set of services, the computer program product comprising a non-transitory computer readable storage medium having program code embodied therewith, the program code readable and executable by a processor to perform a method comprising:

a client computer authenticating with an edge service by authenticating with an Authentication Server (AS) that provides a first ticket allowing the client computer to authenticate with a Ticket Granting Service (TGS), wherein the first ticket has a lifetime that is defined by a predefined start time and a predefined end time, wherein the TGS provides a second ticket allowing the client computer to authenticate with the edge service;

the client computer generating a query key using a one way function of a portion of the first ticket provided by the AS to allow the client computer to authenticate with the TGS;

the edge service issuing a request to the dynamic set of services, the request comprising:
  an identifier associated with the client computer, the identifier being encrypted with the query key,
  a private portion of the request being encrypted with the query key, wherein the private portion of the request is shared only with services that have been authenticated by the AS, and
  a public portion of the request, wherein the public portion of the request is shared with all services that can respond to the request regardless of authentication by the AS;

one or more of said dynamic set of services, in response to ascertaining from said public portion of the request that the one or more of said dynamic set of services is able to respond to the request, responding to the edge service with (i) an identifier associated with the one or more of said dynamic set of services, wherein the one or more of said dynamic set of services caches the query key from a request for use with a future request from the client computer, and (ii) the identifier associated with the client computer, wherein the identifier associated with the client computer is encrypted with the query key;

the edge service authenticating with the one or more of said dynamic set of services, that the edge service is able to respond to the request by authenticating with the AS, wherein the AS provides a third ticket allowing the edge service to authenticate with the TGS, wherein the TGS provides a fourth ticket allowing a single service to authenticate with one or more of said dynamic set of services, wherein the edge service generates a session key using a one way function of a portion of the third ticket provided by the AS to allow the edge service to authenticate with the TGS; and the edge service sending the query key, to said one or more of said dynamic set of services, encrypted using the session key.

6. The computer program product as claimed in claim 5, wherein the method further comprises: accessing a specific service from said one or more of the dynamic set of services by traversing through multiple intermediary services in order to reach the specific service, wherein at least one service from said multiple intermediary services provides access to the query key.

7. The computer program product as claimed in claim 5, wherein the query key is sent, to said one or more of said dynamic set of services, encrypted using the session key by another one or more of said dynamic set of services.

8. The computer program product as claimed in claim 5, wherein
the method further comprises:
  mitigating attacks against said dynamic set of services by:
    modifying, by an untrusted service, the request while in transit by removing an attack vector in the request;
    spoofing, by a trusted service, a fake query from an arbitrary client computer that is different from said client computer, wherein said trusted service:
      generates a fake query key KQ for the arbitrary client computer and sends out a request posting as the arbitrary client computer; and
      turns on a credential delegation such that a downstream service requires current credentials for the arbitrary client computer to be delegated before the arbitrary client computer can act as the arbitrary client computer;
    pretending, by the untrusted service, to respond to the fake query, wherein the untrusted service is unable to respond to the fake query; and
    generating, by the trusted service, a query using a cached copy of the query key that was generated by the client computer.

9. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to authenticate a client computer with an edge service by authenticating with an Authentication Server (AS) that provides a first ticket allowing the client computer to authenticate with a Ticket Granting Service (TGS), wherein the TGS provides a second ticket allowing the client computer to authenticate with the edge service;

program instructions to generate a query key using a one way function of a portion of the first ticket provided by the AS to allow the client computer to authenticate with the TGS;

program instructions to issue a request to a dynamic set of services, the request comprising:
  an identifier associated with the client computer, the identifier being encrypted with the query key,
  a private portion of the request being encrypted with the query key, wherein the private portion of the request is shared only with services that have been authenticated by the AS, and
  a public portion of the request, wherein the public portion of the request is shared with all services that can respond to the request regardless of authentication by the AS;

program instructions to, in response to ascertaining from said public portion of the request that the dynamic set of services is able to respond to the request, respond to the edge service with (i) an identifier associated with one or more of said dynamic set of services, and (ii) the identifier associated with the client computer, wherein the identifier associated with the client computer is encrypted with the query key;

program instructions to authenticate with the one or more of said dynamic set of services that the edge service is able to respond to the request by authenticating with the AS, wherein the AS provides a third ticket allowing the edge service to authenticate with the TGS, wherein the TGS provides a fourth ticket allowing a single service to authenticate with one or more of said dynamic set of services, wherein the edge service generates a session key using a one way function of a portion of the third ticket provided by the AS to allow the edge service to authenticate with the TGS;

program instructions to send the query key, to said one or more of said dynamic set of services, encrypted using the session key; and program instructions to access a specific service from said one or more of the dynamic set of services by traversing through multiple intermediary services in order to reach the specific service, wherein at least one service from said multiple intermediary services provides access to the query key.

10. The computer system as claimed in claim 9, further comprising:

program instructions to mitigate attacks against said dynamic set of services by:

modifying, by an untrusted service, the request while in transit by removing an attack vector in the request;

spoofing, by a trusted service, a fake query from an arbitrary client computer that is different from said client computer, wherein said trusted service:

generates a fake query key KQ for the arbitrary client computer and sends out a request posting as the arbitrary client computer; and turns on a credential delegation such that a downstream service requires current credentials for the arbitrary client computer to be delegated before the arbitrary client computer can act as the arbitrary client computer;

pretending, by the untrusted service, to respond to the fake query, wherein the untrusted service is unable to respond to the fake query; and generating, by the trusted service, a query using a cached copy of the query key that was generated by the client computer.

11. The computer system claimed in claim 9, wherein the one or more of said dynamic set of services caches the query key from a request for use with a future request from the client computer.

12. The computer system as claimed in claim 9, wherein the query key is sent, to said one or more of said dynamic set of services, encrypted using the session key by another one or more of said dynamic set of services.

* * * * *